(12) United States Patent
Penny et al.

(10) Patent No.: US 11,879,275 B2
(45) Date of Patent: Jan. 23, 2024

(54) GEARED ADJUSTABLE PHONE BRACKET

(71) Applicant: OnQ Solutions, Inc., Hayward, CA (US)

(72) Inventors: Steven D. Penny, Oakland, CA (US); Sean A. Naderzad, San Jose, CA (US)

(73) Assignee: OnQ Solutions, Inc., Hayward, CA (US)

( * ) Notice: Subject to any disclaimer, the term of this patent is extended or adjusted under 35 U.S.C. 154(b) by 0 days.

(21) Appl. No.: 17/887,692

(22) Filed: Aug. 15, 2022

(65) Prior Publication Data

US 2023/0407683 A1 Dec. 21, 2023

Related U.S. Application Data

(60) Provisional application No. 63/352,337, filed on Jun. 15, 2022, provisional application No. 63/352,336, filed on Jun. 15, 2022.

(51) Int. Cl.
| | |
|---|---|
| *E05B 73/00* | (2006.01) |
| *F16B 2/12* | (2006.01) |
| *A47F 5/16* | (2006.01) |
| *H04M 1/02* | (2006.01) |

(52) U.S. Cl.
CPC ............ *E05B 73/0082* (2013.01); *A47F 5/16* (2013.01); *F16B 2/12* (2013.01); *H04M 1/0202* (2013.01)

(58) Field of Classification Search
CPC ........ E05B 73/0082; A47F 5/16; A47F 7/024; A47F 7/0246; F16B 2/12; F16B 2/06; H04M 1/0202; F16M 11/041; F16M 11/02; F16M 2200/025
USPC ........................................................ 248/551
See application file for complete search history.

(56) References Cited

U.S. PATENT DOCUMENTS

| | | | |
|---|---|---|---|
| 10,378,248 B1 | 8/2019 | Kelsch et al. | |
| 10,448,759 B1 * | 10/2019 | Chapuis | .................... F16B 2/10 |
| 10,858,865 B2 | 12/2020 | Kelsch et al. | |
| 11,122,917 B2 * | 9/2021 | Chapuis | ............... F16M 11/041 |
| 2014/0263931 A1 * | 9/2014 | Chen | ...................... F16M 13/00 |
| | | | 248/576 |
| 2015/0060624 A1 * | 3/2015 | Huang | ................. F16M 11/105 |
| | | | 248/316.4 |
| 2015/0196140 A1 * | 7/2015 | Lin | ........................ F16M 13/00 |
| | | | 248/551 |
| 2017/0188724 A1 * | 7/2017 | Lin | ........................ F16M 13/00 |
| 2021/0018137 A1 * | 1/2021 | Chapuis | ................. F16M 11/04 |
| 2021/0228000 A1 * | 7/2021 | Schuft | ................. E05B 73/0017 |

\* cited by examiner

*Primary Examiner* — Christopher Garft
(74) *Attorney, Agent, or Firm* — Vierra Magen Marcus LLP

(57) ABSTRACT

Apparatuses for physically securing a portable electronic device to a tabletop of a display table or to another display surface are disclosed. In an embodiment an apparatus includes a main body with left, right, front, and upper arms that are retractable and extendable relative to the main body. A first circular gear engages the left arm and the right arm. A second circular gear engages the lower arm and the upper arm. A lock mechanism is provided to lock the first circular gear to the second circular gear and prevent independent rotation of the first circular gear and the second circular gear.

20 Claims, 10 Drawing Sheets

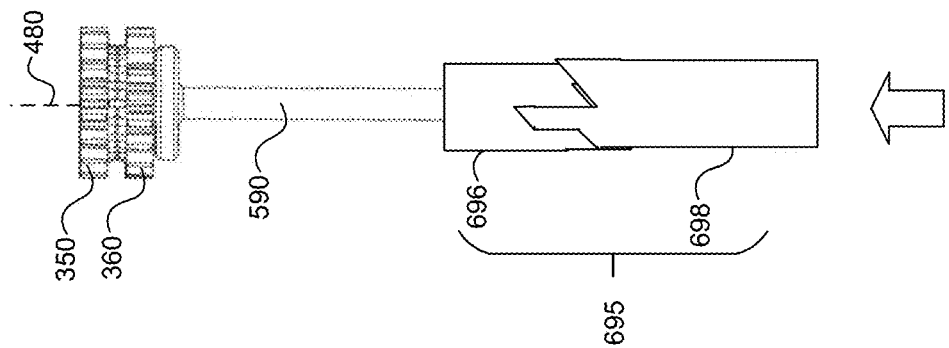
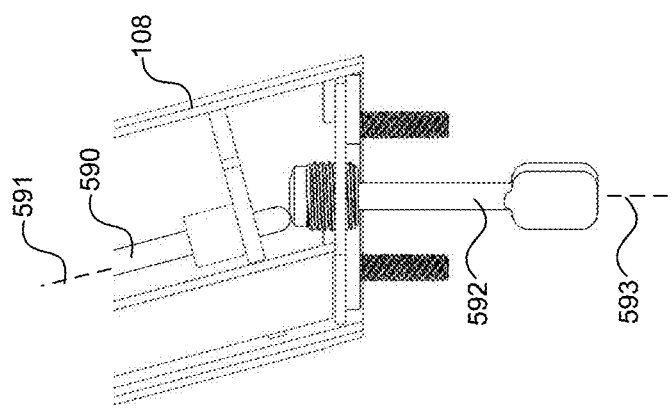
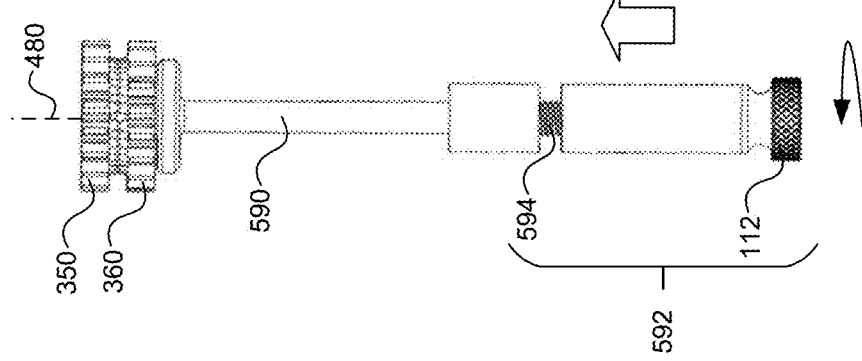

GEARED ADJUSTABLE PHONE BRACKET

CROSS-REFERENCE TO RELATED APPLICATIONS

The present application claims the benefit of U.S. Provisional Patent Applications Nos. 63/352,336 and 63/352,337, filed on Jun. 15, 2022, which are hereby incorporated by reference in their entirety for all purposes.

FIELD OF TECHNOLOGY

Embodiments of the present technology relate to apparatuses that physically secure electronic devices to tabletops of display tables or to other display surfaces.

BACKGROUND

Portable electronic devices, such as cellular telephones ("cellular phone" or "cell phone" e.g., a smartphone including iPhone or android phone), tablets, and laptop computers, are often sold in retail stores. Portable electronic devices may have a relatively high value for their size (e.g., several hundred dollars for devices that may be pocket sized), are easily moved (portable), and may therefore be attractive targets for thieves.

To enable customers to view, touch, and interface with portable electronic devices in a retail store, the electronic devices are often displayed on a display table. The electronic devices are often secured to the display table to prevent theft. For example, an electronic device can be physically secured to a table using a cable or a security mount. Such security mounts may be customized for a specific size of a specific electronic device. It often takes a few weeks to a few months lead-time for a security mount manufacturer to design, build, and distribute a new customized security mount that is suitable for securing a portable electronic device to a display table. It is typically the case that whenever a new model of a portable electronic device is released, the size (i.e., dimensions) of the electronic device is changed compared to the previous model. Accordingly, it is typically the case that whenever a new model of an electronic device is released, a new customized security mount (that is suitable for securing the electronic device to a display table) is not available to retail stores for at least a few weeks, and potentially up to a few months. This leads to a retail store needing to order new security mounts each time a new model of a specific electronic device is released. Where a retail store sells multiple different models of multiple electronic devices, each year that store may need to buy numerous new security mounts, which can be very costly and can thus significantly increase the overhead of the retail store.

SUMMARY

Embodiments of the present technology relate to apparatuses for physically securing a portable electronic device to a tabletop of a display table or to another display surface. In accordance with certain embodiments, an apparatus includes a main body having a top, a bottom, and walls that extends between the top and the bottom. The apparatus includes a left arm, a right arm, a lower arm, and an upper arm, each arm is retractable relative to the main body to secure the portable electronic device and is extendable relative to the main body to release the portable electronic device. A first circular gear engages the left arm and the right arm for extension and retraction of the left arm and the right arm in tandem. A second circular gear engages the lower arm and the upper arm for extension and retraction of the lower arm and the upper arm in tandem. A lock mechanism is provided to lock the first circular gear to the second circular gear and prevent independent rotation of the first circular gear and the second circular gear. The apparatus further includes one or more fasteners that are attachable to a tabletop of a display table or to another display surface to thereby secure the apparatus and the portable electronic device to the tabletop or other display surface.

In accordance with certain embodiments, the first circular gear and the second circular gear are rotatable about a common axis of rotation.

In accordance with certain embodiments, the apparatus further includes a pinion extending along the common axis of rotation and in contact with at least one of the first or second circular gears.

In accordance with certain embodiments, the apparatus further includes a spring located between the first circular gear and the second circular gear to normally bias the first circular gear and the second circular gear apart from one another.

In accordance with certain embodiments, the lock mechanism includes a threaded shaft that extends along the common axis of rotation to contact an end of the pinion such that turning the threaded shaft causes the pinion to move along the common axis of rotation and push the first and second circular gears together.

In accordance with certain embodiments, the threaded shaft has a knurled portion for turning the threaded shaft by hand, the knurled portion configured to be located below the tabletop of the display table.

In accordance with certain embodiments, the first circular gear turns in a first direction for extension and turns in a second direction that is opposite to the first direction for retraction of the left arm and the right arm; and the second circular gear turns in the second direction for extension and turns in the first direction for retraction of the lower arm and the upper arm.

In accordance with certain embodiments, the first circular gear has first engagement features along a surface opposing the second circular gear; and the second circular gear has second engagement features along a surface opposing the first circular gear to engage the first engagement features.

In accordance with certain embodiments, the lock mechanism is inaccessible when the apparatus is attached to a tabletop or to another display surface, thereby preventing someone from releasing the arms after the arms have been retracted to secure a portable electronic device to the main body and the lock mechanism has been locked.

Embodiments of the present technology relate to apparatuses for physically securing a portable electronic device to a tabletop of a display table or to another display surface. In accordance with certain embodiments, an apparatus includes a main body having a top, a bottom, and walls that extends between the top and the bottom, with a left slot, a right slot, a front slot, and a back slot in the walls of the main body. The apparatus includes a left arm, a right arm, a lower arm, and an upper arm that extend respectively through the left slot, the right slot, the front slot, and the back slot, each arm has securing features to secure respective sides of the portable electronic device, each arm is retractable relative to the main body to secure the portable electronic device and is extendable relative to the main body to release the portable electronic device. A first circular gear engages the left arm and the right arm, the first circular gear rotates about an axis in a first direction for extension of the left arm and the right arm in tandem and rotates about the axis in a second direction that is opposite to the first direction for retraction of the left arm and the right arm in tandem. A second circular gear engages the lower arm and the upper arm, the second circular gear rotates about the axis in the second direction for extension of the lower arm and the upper arm in tandem and rotates about the axis in the first direction for retraction of the lower arm and the upper arm in tandem. A spring is provided to maintain separation between the first circular gear and the second circular gear. A lock mechanism is provided to lock the first circular gear and the second circular gear together to thereby prevent independent rotation of the first circular gear and the second circular gear.

In accordance with certain embodiments, the apparatus further comprises a post extending downward from the bottom of the main body; and one or more fasteners that extend downward from the post and is/are attachable to a tabletop of a display table or to another display surface to thereby secure the apparatus and the cell phone to the tabletop or other display surface.

In accordance with certain embodiments, the lock mechanism includes a shaft that extends along the axis through the post and is movable along the axis to cause the first circular gear and the second circular gear to engage.

In accordance with certain embodiments, the shaft includes a threaded portion such that rotation of the shaft causes the shaft to move along the axis and includes a knurled portion to enable tool-free rotation of the shaft.

In accordance with certain embodiments, the lock mechanism includes a rotating cam body to maintain the second circular gear at a raised location that keeps the first circular gear and the second circular gear engaged and rotates and drops to enable separation of the first circular gear and the second circular gear.

In accordance with certain embodiments, the left arm and the right arm have engagement features to engage corresponding engagement features of the first circular gear; and the lower arm and an upper arm have engagement features to engage corresponding engagement features of the second circular gear.

In accordance with certain embodiments, the first circular gear has first engagement features along a surface opposing the second circular gear; and the second circular gear has engagement features along a surface opposing the first circular gear to engage the first engagement features.

Embodiments of the present technology relate to security mounts for physically securing a portable electronic device to a tabletop of a display table or to another display surface. In accordance with certain embodiments, a security mount comprises a main body having a top, a bottom, and walls that extends between the top and the bottom with a post extending downward from the bottom of the main body. One or more fasteners extend downward from the post and are attachable to a tabletop of a display table or to another display surface to thereby secure the security mount and the portable electronic device to the tabletop or other display surface. a left slot, a right slot, a front slot, and a back slot are provided in the walls of the main body. A left arm, a right arm, a lower arm, and an upper arm extend respectively through the left slot, the right slot, the front slot, and the back slot, each arm has securing features to secure respective sides of the portable electronic device, each arm is retractable relative to the main body to secure the portable electronic device and is extendable relative to the main body to release the portable electronic device. A first circular gear engages the left arm and the right arm, the first circular gear rotates about an axis in a first direction for extension of the left arm and the right arm in tandem and rotates about the axis in a second direction that is opposite to the first direction for retraction of the left arm and the right arm in tandem. A second circular gear engages the lower arm and the upper arm, the second circular gear rotates about the axis in the second direction for extension of the lower arm and the upper arm in tandem and rotates about the axis in the first direction for retraction of the lower arm and the upper arm in tandem. A spring maintains separation between the first circular gear and the second circular gear. A pinion extends along the axis of rotation through the first circular gear and the second circular gear. A lock mechanism is coupled to the pinion, the lock mechanism having an unlocked configuration in which the first circular gear and the second circular gear are separated by the spring and a locked configuration in which the first circular gear and the second circular gear are forced together by the pinion.

In accordance with certain embodiments, the lock mechanism includes a shaft that is movable between a locked configuration in which the shaft maintains the pinion and the second circular gear in a raised position such that the second circular gear engages the first circular gear and an unlocked configuration in which the shaft maintains the pinion in a lowered position and the spring maintains separation between the first circular gear and the second circular gear.

In accordance with certain embodiments, the lock mechanism extends downward from the post for access from an underside of the tabletop to prevent someone from releasing the lock mechanism without accessing the underside of the tabletop.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 5A-B illustrate examples of lock mechanisms that include a threaded shaft.

FIG. 6 illustrates an example of a lock mechanism that includes a rotating cam.

DETAILED DESCRIPTION

Embodiments of the present technology generally relate to adjustable security mounts that can be used to physically secure a range of portable electronic devices (e.g., with different physical dimensions) to tabletops of display tables or to other display surfaces. The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein but are to be accorded the widest scope consistent with the principles and novel features herein disclosed.

Figure 1A:
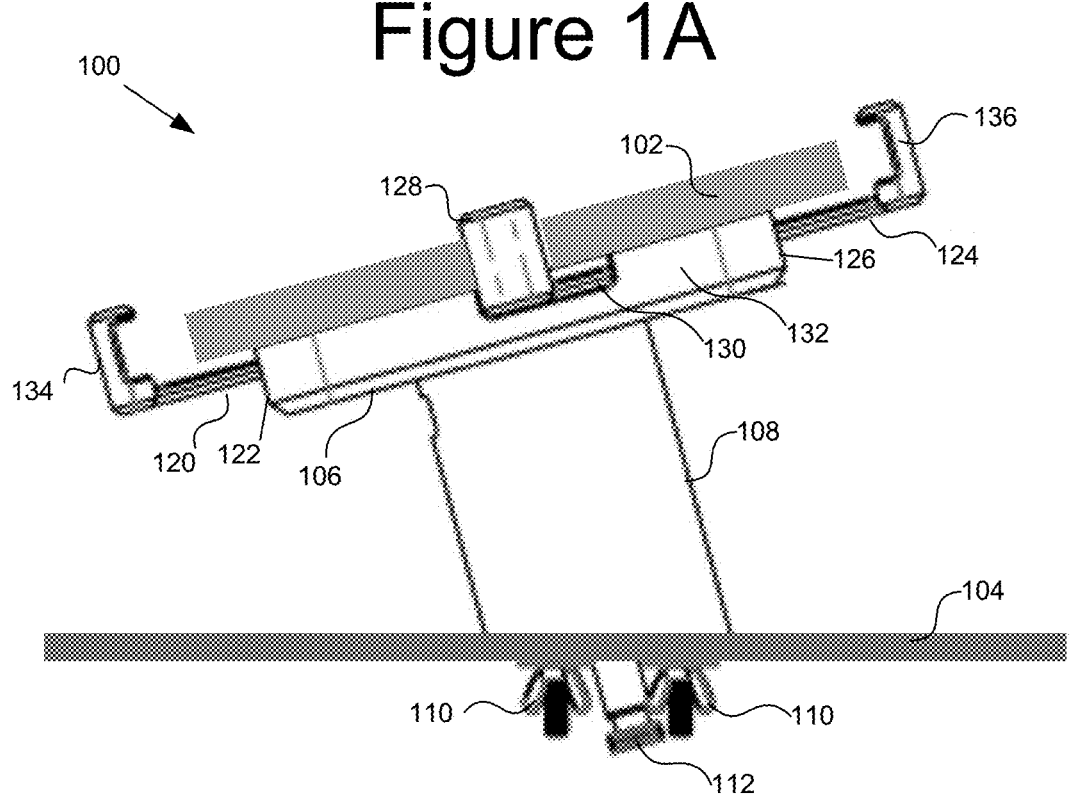
FIGS. 1A-B illustrate an example of a security mount for a portable electronic device.

FIG. 1A shows an example of an apparatus 100 (a security mount) for physically securing a portable electronic device 102 (e.g., a cell phone) to a tabletop 104 of a display table or to another display surface (viewed from the right side). A lower arm 120 extends through a front slot (not visible in FIG. 1A) in a front wall 122 of a main body 106. An upper arm 124 extends through a back slot (not visible in FIG. 1A) in back wall 126 of main body 106. A right arm 128 extends through right slot 130 in right wall 132 of main body 106 (and a left arm 140, which is not visible in FIG. 1B, extends through a left slot in a left wall of main body 106).

Arms (including lower arm 120, upper arm 124, right arm 128, and the left arm 140) are movable so that they can extend and retract with respect to main body 106. When extended (e.g., as shown in FIG. 1A) the arms 120, 124, 128, 140 allow a portable electronic device (e.g., portable electronic device 102) to be placed on main body 106 or removed from main body 106 as shown. Each arm has securing features (e.g., braces) to secure portable electronic device 102. For example, lower arm 120 has brace 134 and upper arm 124 has brace 136, which are configured to engage and secure respective sides of portable electronic device 102 when the arms are retracted. According to aspects of the present technology, arms may be retracted (at least partially) to secure a portable electronic device to security mount 100 (and thereby secure it to tabletop 104) and may be locked so that removal of the portable electronic device requires unlocking, which may require access to the underside of tabletop 104.

The security mount 100 includes a post 108 that extends downward from the bottom of main body 106. A plurality of fasteners 110 (four bolts with wingnuts in the example of FIG. 1A) extend downward from the post through tabletop 104. Fasteners 110 are attachable to tabletop 104 (e.g., a tabletop of a display table or to another display surface) to thereby secure security mount 100 and portable electronic device 102 (e.g., a cell phone) to tabletop 104. For example, wingnuts may be tightened to secure security mount 100 to tabletop 104. Also shown is a knurled portion 112 of a threaded shaft that forms part of a locking mechanism to lock the arms and thereby secure portable electronic device 102. The underside of tabletop 104 may be inaccessible when security mount 100 is attached to tabletop 104 so that fasteners 110 and knurled portion 112 are inaccessible.

Figure 1B:
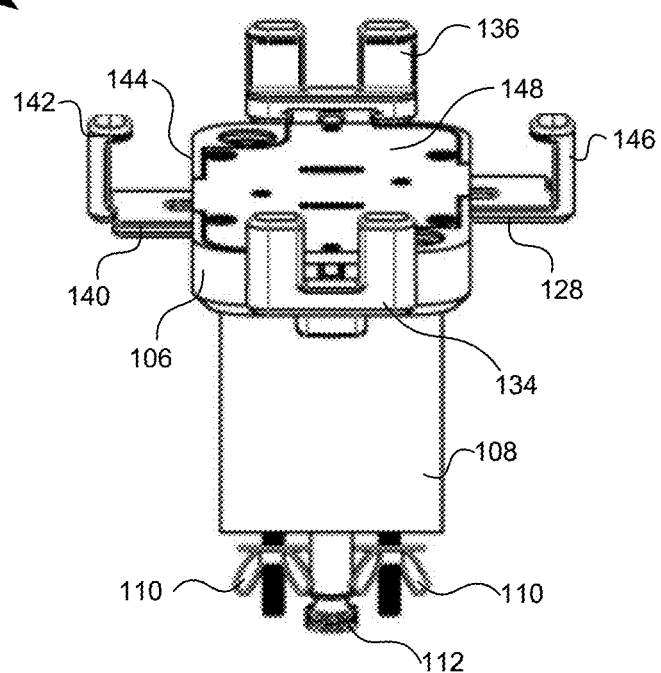

FIG. 1B shows security mount 100 (viewed from the front) including features described above with respect to FIG. 1A including main body 106, post 108, fasteners 110, knurled portion 112 (tabletop 104 and portable electronic device 102 are omitted for clarity), front brace 134, back brace 136 and right arm 128. FIG. 1B also shows left arm 140 (with left brace 142) extending through a left slot in left wall 144 and shows right brace 146 of right arm 128. The top wall 148 of main body 106 (on which a portable electronic device may be placed) is visible in this view. Top wall 148 may be formed of a removable cover that is separable from the remainder of main body 106. For example, such a removable cover may be screwed to the remainder of main body 106 by screws that are covered by a portable electronic device when present so that they cannot be accessed when a portable electronic device is secured in place.

FIGS. 2A-2D illustrate extension and retraction of arms, including left arm 140 (and corresponding left brace 142), right arm 128 (and corresponding right brace 146), lower arm 120 (and corresponding front brace 134) and upper arm 124 (and corresponding back brace 136), with respect to main body 106.

Figure 2A:
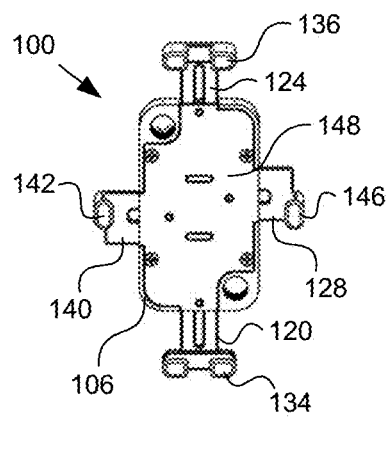
FIGS. 2A-D illustrate examples of extension and retraction of arms of a security mount to secure a portable electronic device.

FIG. 2A shows a top-down view of security mount 100 with arms, including left arm 140 (and left brace 142), right arm 128 (and right brace 146), lower arm 120 (and front brace 134) and upper arm 124 (and back brace 136), fully extended with respect to main body 106. This configuration provides sufficient separation between left brace 142, right brace 146, front brace 134, and back brace 136 to place a portable electronic device on top wall 148 of main body 106.

Figure 2B:
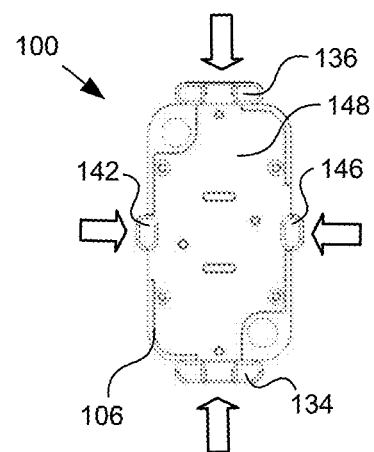

FIG. 2B shows a top-down view of security mount 100 with arms, including left arm 140 (and left brace 142), right arm 128 (and right brace 146), lower arm 120 (and front brace 134) and upper arm 124 (and back brace 136), fully retracted with respect to main body 106 (in direction illustrated by arrows), such that arms 140, 128, 120, 124 are retracted into main body 106 leaving left brace 142, right brace 146, front brace 134, and back brace 136 visible in this view. A fully or partially retracted configuration allows left brace 142, right brace 146, front brace 134, and back brace 136 to secure a portable electronic device in place on top wall 148 of main body 106. For example, left brace 142, right brace 146, front brace 134, and back brace 136 may extend around sides and at least partially over a top surface of a portable electronic device to prevent the portable electronic device from being moved in any direction with respect to main body 106.

Figure 2C:
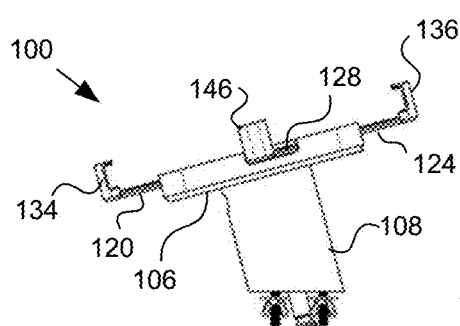

FIG. 2C shows a side view of security mount 100 with arms, including left arm 140 (not visible in FIG. 2C), right arm 128 (and right brace 146), lower arm 120 (and front brace 134) and upper arm 124 (and back brace 136), fully extended with respect to main body 106 (as in FIG. 2A). This configuration provides sufficient separation between left brace 142, right brace 146, front brace 134, and back brace 136 to place a portable electronic device on top wall 148 of main body 106.

Figure 2D:
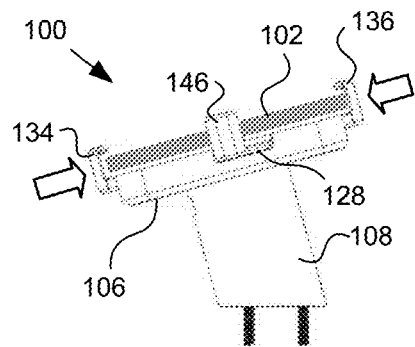

FIG. 2D shows a side view of security mount 100 with arms, including left arm 140 (not visible in FIG. 2D), right arm 128 (and right brace 146), lower arm 120 (and front brace 134) and upper arm 124 (and back brace 136), retracted with respect to main body 106 (in direction illustrated by arrows) and portable electronic device 102, such that arms 140, 128, 120, 124 are retracted into main body 106 leaving right brace 146, front brace 134, and back brace 136 visible in this view. A fully or partially retracted configuration allows left brace 142, right brace 146, front brace 134, and back brace 136 to secure portable electronic device 102 in place on top of main body 106. For example, left brace 142, right brace 146, front brace 134, and back brace 136 may extend around sides and at least partially over a top surface of portable electronic device 102 as shown to prevent the portable electronic device from being moved in any direction with respect to main body 106

Figure 3A:
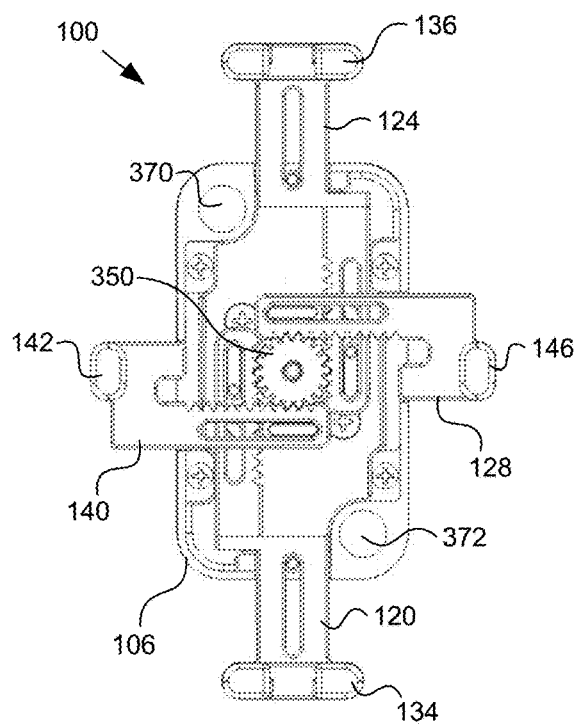
FIGS. 3A-C illustrate an example implementation of arms of a security mount.
Figure 3C:
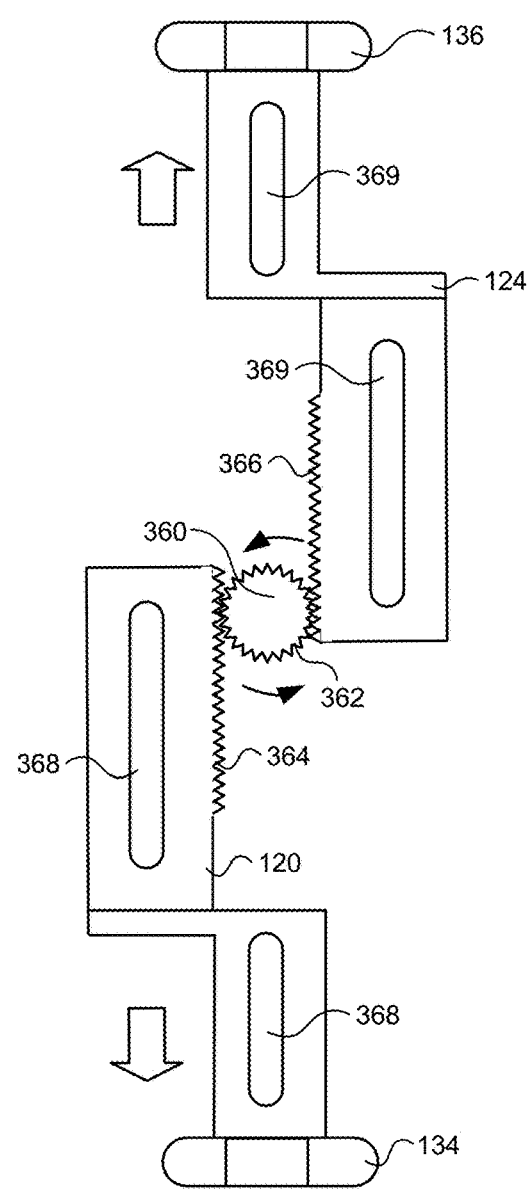
Figure 3B:
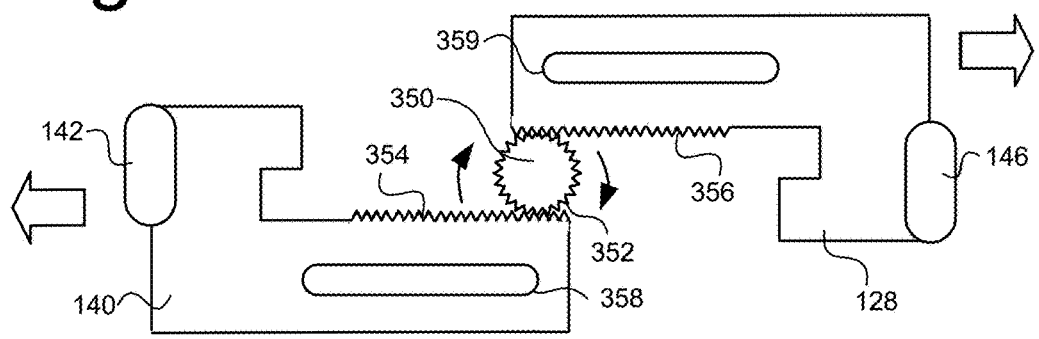

FIGS. 3A-C illustrate an example implementation of security mount 100 including details of left arm 140, right arm 128, lower arm 120, upper arm 124 and related features.

FIG. 3A shows a top-down view of security mount 100, without top wall 148, so that arms 140, 128, 120, 124 can be more clearly seen. A first circular gear 350 engages left arm 140 and right arm 128 for extension and retraction of left arm 140 and right arm 128 in tandem (e.g., both arms are coupled to first circular gear 350 to extend together and retract together as a pair). Such paired retraction centers a portable electronic device as arms retract, which may ensure that the portable electronic device is suitably positioned. While not visible in FIG. 3A, a second circular gear 360, located under first circular gear 350, similarly engages lower arm 120 and upper arm 124.

FIG. 3A also shows holes 370 and 372 in main body 106. Holes 370, 372 may be configured to accommodate additional components (e.g., ratcheting buttons, not shown) to press upwards on a portable electronic device as described in more detail below.

FIG. 3B shows a more detailed view of first circular gear 350 engaging left arm 140 and right arm 128 of FIG. 3A (first pair of arms). First circular gear 350 has engagement features 352 (cogs or teeth) around an outside edge to engage corresponding engagement features 354 of left arm 140 and engagement features 356 of right arm 128 so that as first circular gear 350 turns in a first direction (e.g., clockwise, as shown by arrows), left arm 140 and right arm 128 both extend in tandem. Similarly, as first circular gear 350 turns in a second direction that is opposite to the first direction (e.g., counter-clockwise), left arm 140 and right arm 128 both retract in tandem. A left slot 358 is provided in left arm 140 to guide movement of left arm 140 (e.g., to confine movement along a single direction for extension and retraction). A right slot 359 is provided in right arm 128 to guide movement of right arm 128 (e.g., to confine movement along a single direction for extension and retraction).

FIG. 3C shows second circular gear 360 engaging lower arm 120 and upper arm 124 of FIG. 3A (second pair of arms). Second circular gear 360 has engagement features 362 (cogs or teeth) around an outside edge to engage corresponding engagement features 364 of lower arm 120 and engagement features 366 of upper arm 124 so that as second circular gear 360 turns in the second direction (e.g., counter-clockwise, as shown by arrows), lower arm 120 and upper arm 124 both extend in tandem. Similarly, as second circular gear 360 turns in the first direction that is opposite to the second direction (e.g., clockwise), lower arm 120 and upper arm 124 both retract in tandem. Front slots 368 are provided in lower arm 120 to guide movement of lower arm 120 (e.g., to confine movement along a single direction for extension and retraction). Back slots 369 are provided in upper arm 124 to guide movement of upper arm 124 (e.g., to confine movement along a single direction for extension and retraction).

First circular gear 350 and second circular gear 360 are rotatable about a common axis of rotation in the example of FIGS. 3A-C (e.g., second circular gear 360 is located under first circular gear 350). First circular gear 350 and second circular gear 360 may be configured so that they can independently rotate in an unlocked configuration and are prevented from independently rotating in a locked configuration. Because first circular gear 350 and second circular gear 360 rotate oppositely for a given operation (e.g., clockwise and counter-clockwise respectively for extension as shown in FIGS. 3B-3C), locking first circular gear 350 and second circular gear 360 together in this way prevents extending one pair of arms (e.g., left arm 140 and right arm 128) without retracting the other pair of arms (e.g., lower arm 120 and upper arm 124). After a portable electronic device is in place (e.g., with arms retracted so that braces engage the portable electronic device), retraction of either pair of arms (either left and right or front and back) is blocked by the portable electronic device. This prevents extending either pair of arms (e.g., extension of left arm 140 and right arm 128 is prevented by the portable electronic device blocking retraction of lower arm 120 and upper arm 124; extension of lower arm 120 and upper arm 124 is prevented by the portable electronic device blocking retraction of left arm 140 and right arm 128).

Figure 4A:
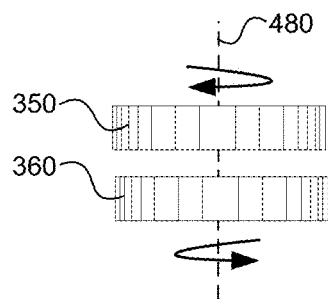
FIGS. 4A-C illustrate circular gears used with arms of a security mount.
Figure 4B:
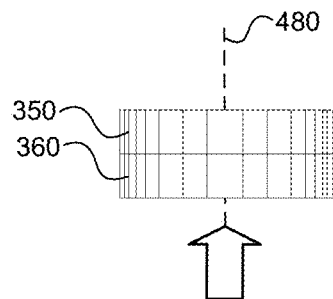

FIGS. 4A-4B illustrate an example of first circular gear 350 and second circular gear 360 in two configurations. FIG. 4A shows an unlocked configuration in which first circular gear 350 and second circular gear 360 are separated and can rotate independently about a common axis 480 as respective pairs of arms extend and retract. FIG. 4B shows a locked configuration in which first circular gear 350 and second circular gear 360 are locked together to prevent independent rotation of first circular gear 350 and second circular gear 360 about common axis 480. In the example of FIG. 4B, first circular gear 350 and second circular gear 360 are placed in the locked configuration by raising second circular gear 360 (e.g., along common axis 480, as shown by the arrow) to a raised position in which it engages the first circular gear 350 (engagement features may be provided to ensure engagement and prevent independent rotation).

When braces 142, 146, 134, 136, engage a portable electronic device and additionally first circular gear 350 and second circular gear 360 are in the locked configuration, combined first circular gear 350 and second circular gear 360 are not rotatable in either direction so that no arm or combination of arms can be extended, and the portable electronic device is secured. A suitable lock mechanism may be provided to lock and unlock first circular gear 350 and second circular gear 360, to thereby lock and unlock arms 120, 124, 128, 140, and thus secure and release a portable electronic device.

Figure 4C:
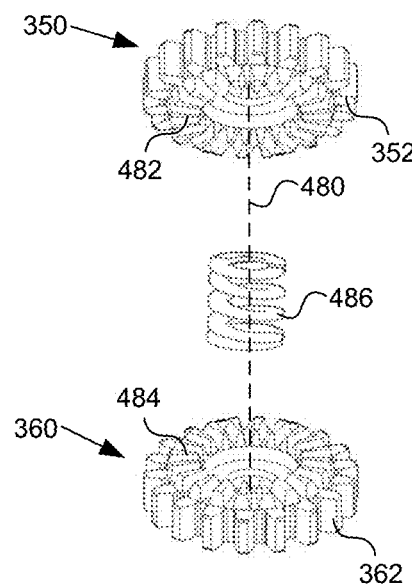

FIG. 4C shows an example of first circular gear 350 and second circular gear 360 in exploded view (expanded along common axis 480). In addition to engagement features 352 for engagement with left arm 140 and right arm 128, first circular gear 350 includes first engagement features 482 (e.g., teeth or cogs) along its bottom surface, opposing second circular gear 360. Similarly, in addition to engagement features 362 for engagement with lower arm 120 and upper arm 124, second circular gear 360 includes second engagement features 484 (e.g., teeth or cogs) along its top surface, opposing first circular gear 350, to engage first engagement features 482 when second circular gear 360 is pushed upwards to engage first circular gear 350. A spring 486 is located between first circular gear 350 and second circular gear 360 to separate first circular gear 350 and second circular gear 360 whenever second circular gear 360 is not pushed upwards (e.g., to maintain an unlocked configuration). First circular gear 350 and second circular gear 360 may be rotatable about a single spindle or axle, or separate spindles/axles, with a lock mechanism to raise second circular gear 360 (against force or bias provided by spring 486) to a raised position and maintain second circular gear 360 in the raised position until it is unlocked.

FIG. 5A illustrates an example of first circular gear 350 and second circular gear 360 with a pinion 590 pushing second circular gear upwards to engage first circular gear 350 (e.g., as shown in FIG. 4B). Pinion 590 extends along common axis 480. An upper portion of pinion 590 extends through second circular gear 360 and may act as a spindle or axle for rotation of second circular gear 360. Pinion 590 is pushed upwards by a lock mechanism that includes threaded shaft 592 that extends along common axis 480 to contact an end of pinion 590. Threaded shaft 592 includes a threaded portion 594 such that rotation of threaded shaft 592 causes threaded shaft 592 to move along common axis 480 (upwards in FIG. 5A). Threaded shaft 592 is in contact with pinion 590 so that movement of threaded shaft 592 causes pinion 590 to move along common axis 480 and push first circular gear 350 and second circular gear 360 together. Threaded shaft 592 also includes knurled portion 112, which is configured to be located below a tabletop of a display table (e.g., as previously shown in FIG. 1A), or more generally, behind a display surface. Knurled portion 112 allows threaded shaft 592 to be turned by hand (enables tool-free rotation for locking and releasing by hand) for raising pinion 590 and second circular gear 360 to lock first circular gear 350 and second circular gear 360 (locked configuration) and lowering pinion 580 to unlock first circular gear 350 and second circular gear 360 (unlocked configuration).

While the example of FIG. 5A shows pinion 590 and threaded shaft 592 extending along common axis 480, in some cases, pinion 590 and threaded shaft 592 may not extend along a common axis. For example, in some cases a main body and post may be angled (e.g., main body 106 and post 108 as shown in FIG. 1A) to angle a screen of a portable electronic device towards a user. This may result in the threaded portion extending at an angle with respect to a tabletop (e.g., knurled portion 112 with respect to tabletop 104 in FIG. 1A). In another example, the axis of a threaded portion may be angled with respect to the axis of a pinion to allow the threaded portion to extend perpendicularly with respect to a tabletop. FIG. 5B shows an example in which pinion 590 extends about axis 591 and threaded shaft 592 extends about axis 593, which is angled with respect to axis 591 (e.g., by about 15 degrees) so that axis 593 extends perpendicularly with respect a tabletop. In this arrangement, threaded shaft 592 forms a plunger that moves vertically to push pinion 590, which is constrained to move along axis 591 (e.g., angled 15 degrees from vertical).

FIG. 6 shows another example of first circular gear 350 and second circular gear 360 with pinion 590 pushing second circular gear upwards to engage first circular gear 350 (e.g., locked configuration shown in FIG. 4B). Pinion 590 extends along common axis 480. An upper portion of pinion 590 extends through second circular gear 360 and may act as a spindle or axle for rotation of second circular gear 360. Pinion 590 is pushed upwards by a lock mechanism 695 that includes a rotating cam body 696 and a plunger 698 and is similar to a mechanism used in some ball-point pens (a retractable pen or "clicky pen") to extend and retract a ball-point refill and maintain the refill in the extended position for use. Rotating cam body 696 may be pushed upward by plunger 698 so that it rotates and latches in a raised position as shown. This maintains pinion 590 and second circular gear 360 in a raised position to lock first circular gear 350 and second circular gear 360 together (locked position). Subsequently, the next time plunger 698 pushes rotating cam body 696, rotating cam body 696 may rotate to another rotational position and then drops to a lower position allowing pinion 590 and second circular gear 360 to drop (under bias of spring 486). Thus, pushing plunger 698 alternately raises and lowers the position of second circular gear 360 between the raised (locked) position and the lowered (unlocked) position. As with the previous example, lock mechanism 695, including plunger 698, and pinion 590 may extend along common axis as shown in FIG. 6 or may extend along axes that are angled (e.g., similarly to the example shown in Figure Other lock mechanisms may also be used to change between a locked and unlocked configuration.

Ratcheting Buttons

In some embodiments, one or more ratcheting buttons may be provided in one or more corresponding holes (e.g., in a main body, in one or more arms, or otherwise) and may be configured to press upwards on a bottom surface of a portable electronic device. This may maintain a portable electronic device pressed upwards within braces, which may eliminate or reduce any gaps between a top surface of a portable electronic device and such braces and may thereby eliminate or reduce gaps that might be used for insertion of tools (e.g., for a crowbar, screwdriver, or other prying instrument) that could be used to remove a portable electronic device from a security mount.

As previously shown in FIG. 3A, a main body may include one or more holes (e.g., holes 370 and 372 in main body 106) that may be adapted to accommodate ratcheting buttons. Additionally, or alternatively, arms (e.g., one or more of arms 120, 124, 128, 140) may include such holes. Ratcheting buttons may be located in such holes so that they can be pressed upwards (e.g., by hand, in a tool-free manner, using thumb pressure or finger pressure alone). A ratcheting mechanism is provided to prevent downward movement of ratcheting buttons in corresponding holes.

Figure 7A:
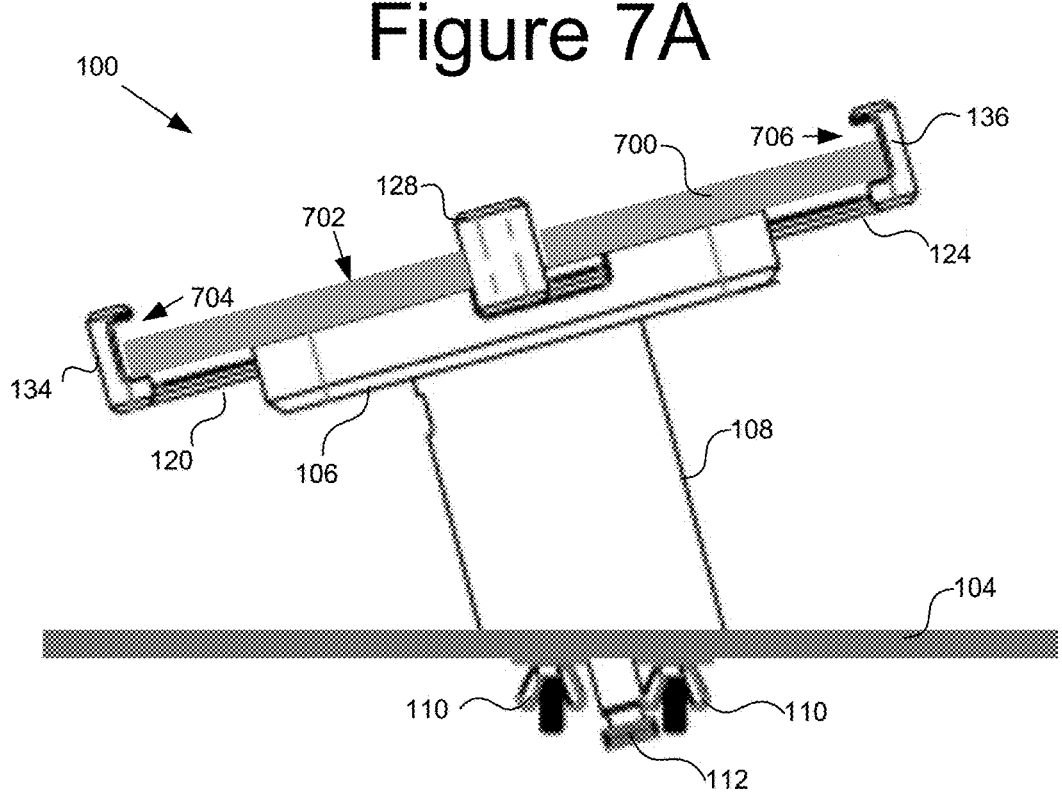
FIGS. 7A-B illustrate an example of a security mount with ratcheting buttons.

FIG. 7A illustrates portable electronic device 700 secured by security mount 100, with braces 134, 136 engaging edges of portable electronic device 700. Security mount 100 is adaptable to accommodate a range of portable electronic devices by using extendable/retractable arms to accommodate a range of device dimensions. Additionally, braces (e.g., including braces 134, 136, 142, 146) may have dimensions to accommodate a range of device thicknesses. This may result in gaps between an upper surface of a portable electronic devices and such braces for at least some portable electronic devices. For example, FIG. 7A shows gap 704 between top surface 702 of portable electronic device 700 and brace 134 and gap 706 between top surface 702 of portable electronic device 700 and brace 136 (similar gaps may be present between top surface 702 and other braces). Such gaps may be undesirable because they provide an opportunity to insert a prying tool. While braces may be customized to eliminate such gaps, such customization may be undesirable (e.g., because of cost and time-delay in obtaining such customized hardware for a number of different portable electronic devices). Aspects of the present technology enable use of braces that can accommodate portable electronic devices having a wide range of thicknesses (e.g., not customized for each device) while eliminating or reducing gaps (e.g., gaps 704, 706) between such braces and a top surface of a portable electronic device (e.g., between braces 134, 136 and top surface 702).

Figure 7B:
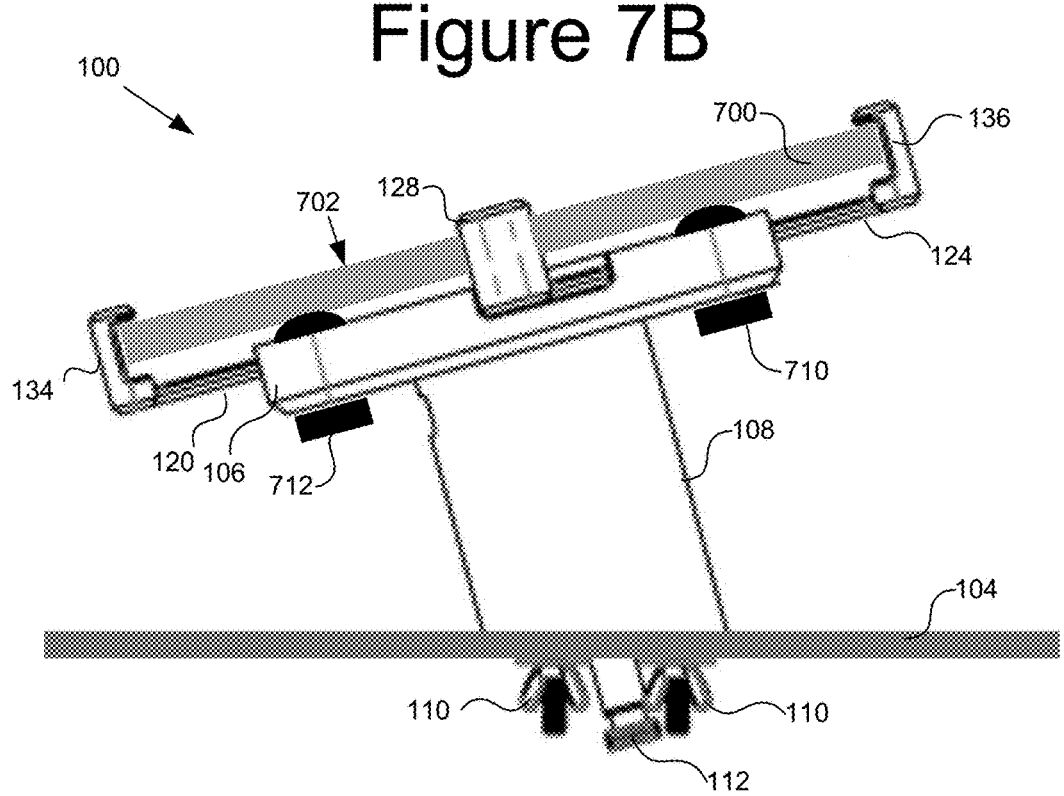

FIG. 7B illustrates an example in which ratcheting button 710 and ratcheting button 712 are located in corresponding holes in main body 106 (e.g., in holes 370 and 372 respectively, not visible in FIG. 7B). Each ratcheting button 710, 712 is configured to be upwardly movable within its corresponding hole with a ratchet mechanism to prevent downward movement of the ratcheting button within the corresponding hole. After portable electronic device 700 is placed as shown in FIG. 7A, with braces securing edges of the portable electronic device, ratcheting buttons (e.g., ratcheting buttons 710, 712) may be pushed upwards (by hand, or otherwise) to push portable electronic device 700 upwards from main body 106 until top surface 702 of portable electronic device 700 is in contact with overlying portions of braces (e.g., braces 134, 136, 142, 146) and any gaps, such as gaps 704 and 706, are eliminated or reduced so that insertion of a prying tool is difficult or impossible. While ratcheting buttons 710, 712 may be accessible in this configuration, because ratcheting buttons 710, 712 cannot be moved downwards, portable electronic device 700 cannot easily be moved downwards to create gaps while portable electronic device 700 is in place.

Figure 8A:
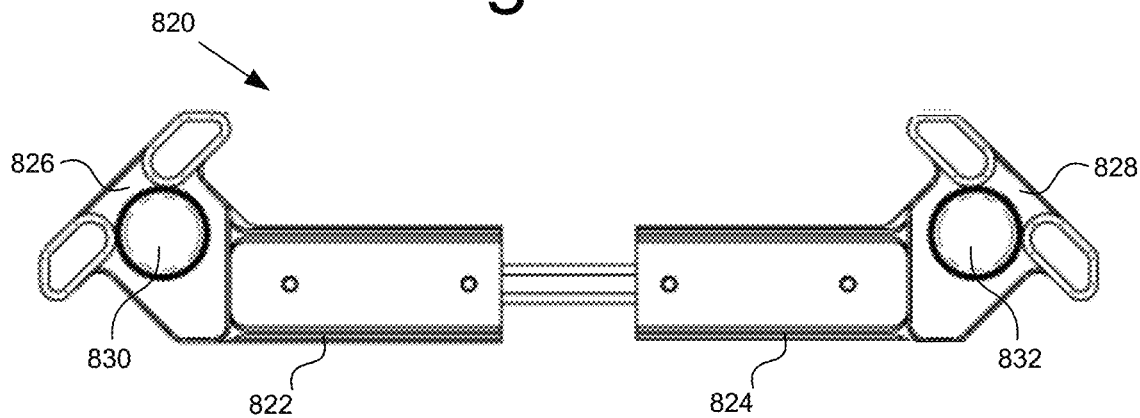
FIGS. 8A-C illustrate an example of ratcheting buttons in security mount arms.

Holes for ratcheting buttons are not limited to the main body of a security mounting. FIG. 8A illustrates an example of an adjustable arm assembly 820 for an adjustable security mounting that includes arm 822 and arm 824 that are extendable and retractable with respect to each other (and with respect to a main body, which is not shown). Brace 826 is attached to arm 822 and brace 828 is attached to arm 824. Unlike braces 134, 136, 142, 146, which are configured to engage edges of a portable electronic device, braces 826, 828 are configured to engage corners of a portable electronic device. Arm 822 includes hole 830, which may be integrated with brace 826 (e.g., brace 826 may be formed of a single piece of material that encompasses hole 830). Arm 824 includes hole 832, which may be integrated with brace 828 (e.g., brace 828 may be formed of a single piece of material that encompasses hole 832).

Figure 8B:
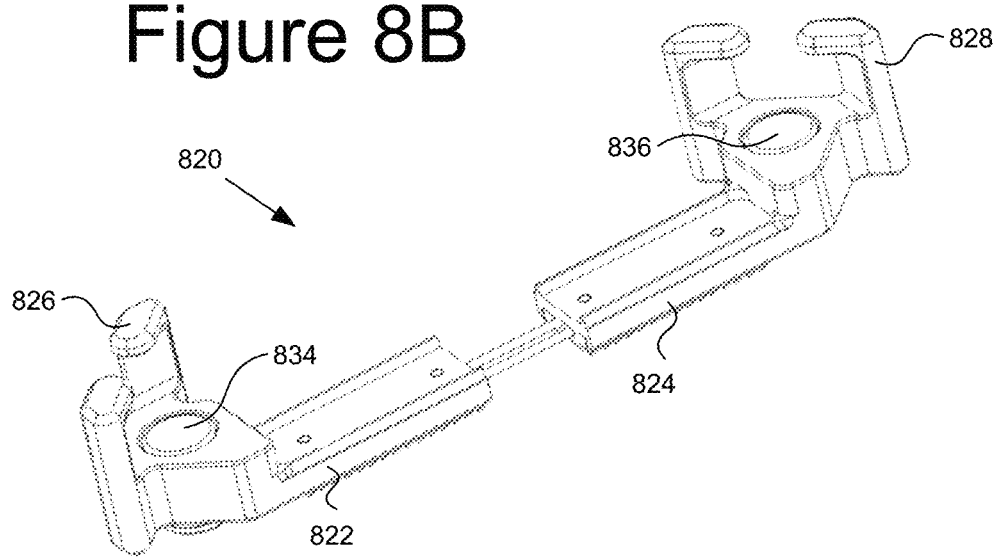

FIG. 8B shows a perspective view of adjustable arm assembly 820 with ratcheting button 834 inserted in hole 830 in arm 822 and ratcheting button 836 inserted in hole 832 in arm 824. Ratchet mechanisms may be provided to ensure that ratcheting buttons 834, 836 are movable upward to raise a portable electronic device into a secure configuration and are not movable downward so that the portable electronic device remains secure.

Figure 8C:
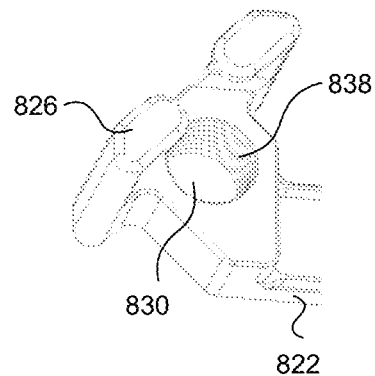

FIG. 8C shows another perspective view of a portion of arm 822, including brace 826 and hole 830 (without ratcheting button 834). A portion of a ratchet surface 838 may be seen in hole 830. Hole 830 has a cylindrical shape (e.g., cylindrical symmetry about a central axis) with a cylindrical inner wall (a portion of which is visible). Ratchet surface 838 includes a series of teeth or steps that extend circumferentially around the inner wall. Ratchet surface 838 may occupy the entire cylindrical inner wall or may occupy one or more portions of the cylindrical inner wall. Teeth of ratchet surface 838 are configured to engage one or more pawls of a corresponding ratcheting button (e.g., ratcheting button 834), with the combination of ratchet surface 838 and such pawls forming a ratchet mechanism to prevent downward movement of the ratcheting button within the corresponding hole.

Figure 9A:
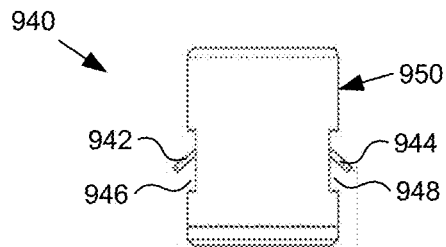
FIGS. 9A-C illustrate an example of a ratcheting button.
Figure 9C:
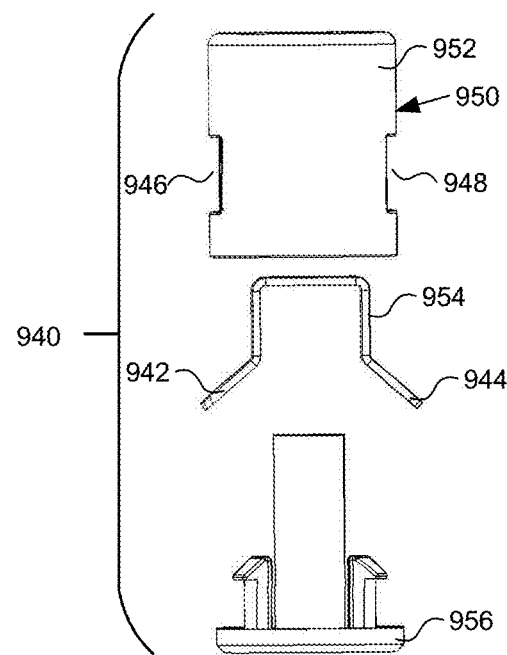
Figure 9B:
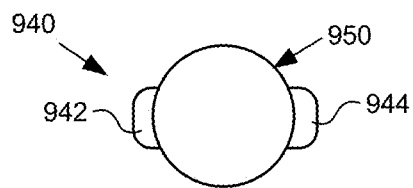

FIGS. 9A-B illustrate an example of a ratcheting button 940 that may be used in combination with any of the holes above (e.g., holes 370 and 372 in main body 106 or holes 830 and 832 in arms 822 and 824) or similar holes. Ratcheting button 940 includes a first pawl 942 and a second pawl 944 extending from opposite sides of ratcheting button 940. In other examples, different numbers of pawls may be provided (e.g., one pawl, or more than two pawls). Ratcheting button 940 has a cylindrical shape with first pawl 942 extending through a first opening 946 and second pawl 944 extending through a second opening 948 in a cylindrical outer wall 950 so that they both extend beyond cylindrical outer wall 950 (e.g., beyond the radius of cylindrical outer wall 950).

FIG. 9B shows a top-down view of ratcheting button 940 that shows how first pawl 942 and second pawl 944 extend beyond cylindrical outer wall 950 of ratcheting button 940. In this arrangement, first pawl 942 and second pawl 944 are configured to engage one or more ratchet surface(s) that may be present on a cylindrical inner wall of a corresponding hole.

FIG. 9C shows an exploded view of ratcheting button 940 that includes a cylindrical thimble portion 952 with first opening 946 and second opening 948 on opposite sides of cylindrical outer wall 950. Ratcheting button 940 includes spring 954 (to be located in the cylindrical thimble portion 952), with a first end (to extend through first opening 946) to form first pawl 942 and a second end (to extend through second opening 948) to form second pawl 944. Spring 954 may be formed of a suitable spring material (e.g., a metal, such as steel, or an alloy) so that it is elastic and can be deformed, or deflected, and return to its original shape. Thus, first pawl 942 and second pawl 944 may be deflected inwards (towards the center of ratcheting button 940) and return to their prior configuration as ratcheting button is moved in a hole with one or more ratchet surface. A thimble cap 956 is provided to maintain spring 954 in a specified location, with first pawl 942 extending through first opening 946 and second pawl 944 extending through second opening 948 and to provide a surface for applying upward force on ratcheting button 940.

Figure 10A:
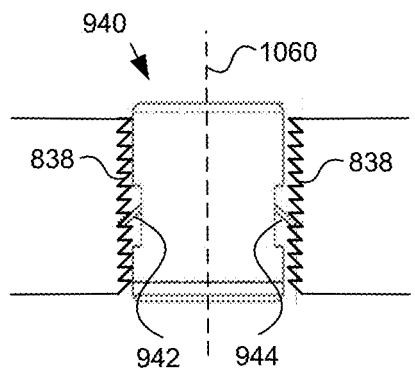
FIGS. 10A-B illustrate an example of a ratcheting button engaging a ratchet surface on an inner wall of a hole.
Figure 10B:
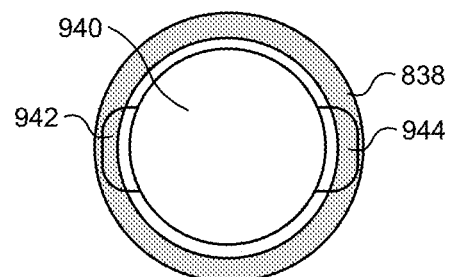

FIGS. 10A-B illustrate ratcheting button 940 in hole 830 and how pawls 942, 944 engage ratchet surface 838. FIGS. 10A-B shows ratchet surface 838 extending circumferentially (through 360 degrees) about a central axis 1060 to engage first pawl 942 and second pawl 944. Hole 830 is cylindrically symmetric about central axis 1060 so that ratchet surface 838 can be seen on both sides of ratcheting button 940 in FIG. 10A and ratchet surface 838 thus engages both pawls. Ratcheting button 940 is generally cylindrical, with cylindrical outer wall 950 being defined by an axis that, when inserted in hole 830, coincides with central axis 1060. Movement of ratcheting button 940 is generally upwards along central axis 1060. Ratcheting button 940 fits in hole 830 with some small clearance between cylindrical outer wall 950 and teeth of ratchet surface 838. Indentations between teeth of ratchet surface 838 allow first pawl 942 and second pawl 944 to extend beyond cylindrical outer wall 950 and engage ratchet surface 838. When pushed upwards, first pawl 942 and second pawl 944 are deflected inwards (towards central axis 1060) by teeth of ratchet surface 838 as spring 954 bends and then spring outwards into indentations of ratchet surface 838 (FIG. 10B shows ratchet surface 838 as a shaded ring indicating the depth of teeth and indentations). When pushed downwards, first pawl 942 and second pawl 944 engage ratchet surface 838 and prevent downward movement of ratcheting button 940. Thus, the combination of first pawl 942, second pawl 944 and ratchet surface 838 provide a ratchet mechanism to prevent downward movement of ratcheting button 940 within corresponding hole 830. Because ratcheting button 940 cannot move down in hole 830, returning ratcheting button 940 to a lower position (e.g., to allow insertion of another portable electronic device) may include pushing the ratcheting button 940 all the way up and out of hole 830 and then reinserting it from below in what may be referred to as a "push-through" configuration, which can only be performed when a security mount that includes hole 830 and ratcheting button 940 is not being used to secure a portable electronic device.

While the example shown in FIGS. 10A-B includes a ratcheting button with a cylindrical outer wall that fits in a cylindrical hole, other shapes may also be used (e.g., square, rectangular, polygonal, elliptical, or other). A ratcheting surface or ratcheting surfaces may be configured according to the shape used and the location(s) of any pawl(s).

In an alternative to the push-through arrangement above, a ratcheting button (e.g., ratcheting button 940) may have two configurations. In a first configuration, the ratcheting mechanism prevents downward movement while in a second configuration the ratcheting mechanism is disengaged to enable downward movement.

FIGS. 11A-D illustrate an example of a hole 1170 (e.g., any of holes 370 and 372 in main body 106 or holes 830 and 832 in arms 822 and 824) containing ratcheting button 940. Hole 1170 has a cylindrical inner wall including a first ratchet surface 1172 and a second ratchet surface 1174 on opposite sides of hole 1170 (with shading to indicate depth of teeth/indentations). Ratchet surfaces 1172, 1174 are separated by a first recess 1176 and a second recess 1178, where no teeth are located so that no ratchet surface is present (e.g., an inner wall may be smooth).

Figure 11A:
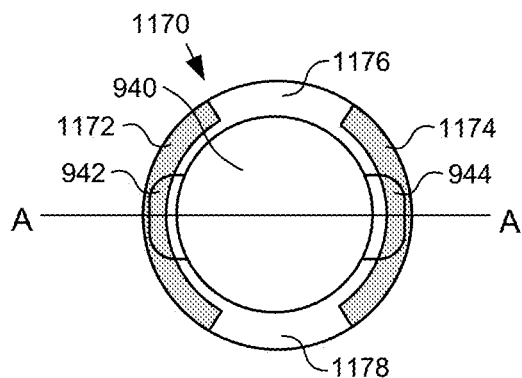
FIGS. 11A-G illustrate examples of ratcheting buttons engaging and disengaged from two ratchet surfaces on an inner wall of a hole.
Figure 11B:
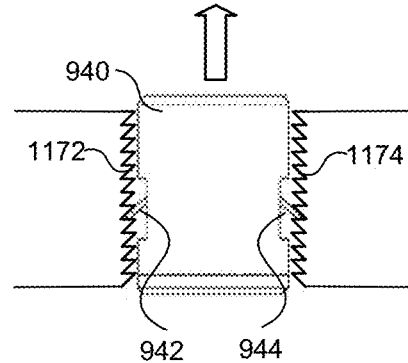

In the configuration illustrated in FIGS. 11A-B, ratcheting button 940 has a first orientation (with pawls extending on either side in this view) in which first pawl 942 engages first ratchet surface 1172 and second pawl 944 engages second ratchet surface 1174 to prevent downward movement of ratcheting button 940. FIG. 11A shows a top-down view and FIG. 11B shows a cross sectional view along the plane marked A-A in FIG. 11A. In this orientation, ratcheting button 940 can only be moved upwards and cannot be moved downwards.

Figure 11C:
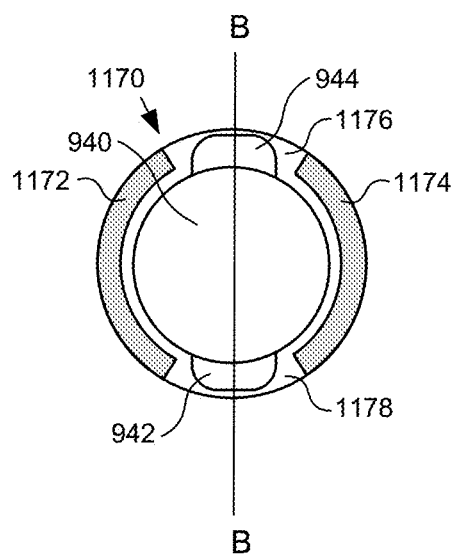
Figure 11D:
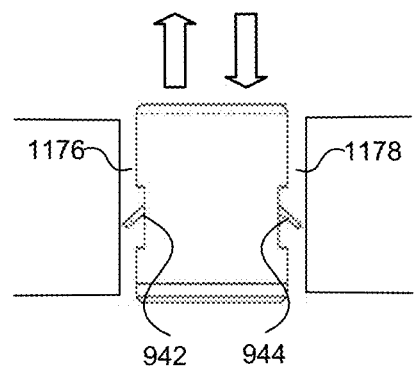

Ratcheting button 940 is rotatable within hole 1170 and FIGS. 11C-D illustrate ratcheting button 940 in a second configuration (second orientation) that results from rotating it about ninety degrees (90°). FIG. 11C shows a top-down view and FIG. 11D shows a cross sectional view along the plane marked B-B in FIG. 11C. When ratcheting button 940 is in the second orientation shown, first pawl 943 aligns with first recess 1176 and second pawl 944 aligns with second recess 1178 so that first and second pawls 942 and 944 do not engage first and second ratchet surfaces 1172 and 1174. In this orientation, ratcheting button 940 may be moved up or down. This may allow ratcheting button 940 to be repositioned (lowered) for insertion of a portable electronic device without removing it from hole 1170. In some cases, a ratcheting button may be captured within such a hole with downward movement enabled by rotating the ratcheting button to an appropriate orientation. Such a ratcheting button that can be repositioned without removal from a corresponding hole and/or is captured within the corresponding hole reduces the risk of losing or damaging the ratcheting button.

Features may be provided on ratcheting button 940 to facilitate access for rotation of ratcheting button 940 from above so that any such features are not accessible when a portable electronic device is present. For example, features for engaging a tool (e.g., a slot for a screwdriver) or for rotation by hand (e.g., a surface that is textured for enhanced grip) may be provided on the top of ratcheting button 940 and not on the bottom (which may be smooth), so that the features that allow for manual rotation of the ratcheting button can only be accessed when a security mount that includes hole 1170 and ratcheting button 940 is not being used to secure a portable electronic device.

Figure 11E:
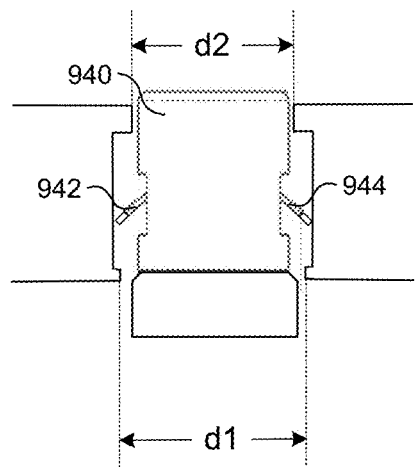
Figure 11F:
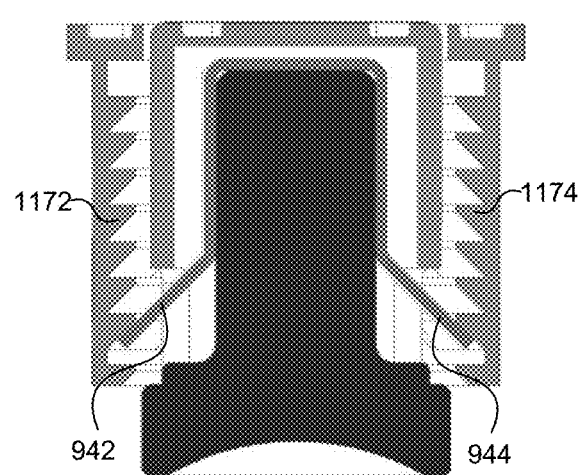

FIGS. 11E-F show examples of ratcheting button 940 captured within a hole that includes a lower opening having a diameter of d1 and an upper opening having a diameter of d2. Diameters d1 and d2 may be sufficiently narrow to ensure that ratcheting button 940 cannot be removed from the hole after insertion. For example, pawls 942, 944 and/or other features of ratcheting button 940 may extend beyond diameter d2 to ensure that ratcheting button 940 cannot be pushed upwards beyond an upper limit. Pawls 942, 944 and/or other features of ratcheting button 940 may extend beyond diameter d1 to ensure that ratcheting button 940 cannot be pushed downwards beyond a lower limit (e.g., after initial insertion, pawls 942, 944 in their extended configuration may prevent removal in a downward direction).

FIG. 11F shows a cross-sectional view of an implementation of ratcheting button 940 including pawls 942, 944 engaging first and second ratchet surfaces 1172 and 1174, with ratcheting button captured so that it cannot be removed. Ratcheting button 940 may remain captured within the hole regardless of rotation (e.g., regardless of whether pawls are aligned with ratchet surfaces or not).

In an example implementation, rotation of a ratcheting button (e.g., rotation between an orientation in which pawls engage ratchet surfaces and an orientation in which pawls are disengaged) may only be enabled when the ratcheting button is one or more vertical position. For example, when a ratcheting button is at or near the top of its vertical range and/or at or near the bottom of its vertical range, it may be rotatable. Otherwise, rotation may be prevented to avoid rotation and lowering of a ratcheting button that has been ratcheted upwards to engage an electronic device. With no electronic device in place (e.g., after removal of an electronic device) such a ratcheting button may be raised and rotated to disengage pawls so that it can be lowered. Subsequently, it may be rotated to engage pawls so that it can be raised to secure an electronic device.

Figure 11G:
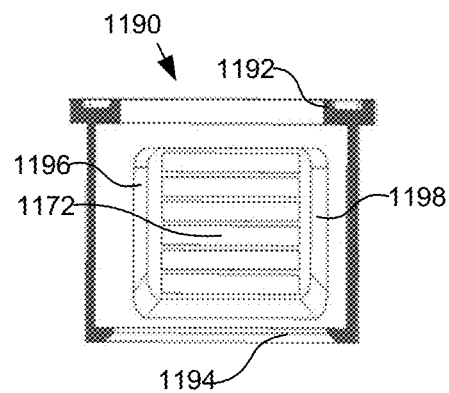

FIG. 11G shows an example implementation of a hole 1190 with features to limit movement of a ratcheting button. FIG. 11G shows a cross sectional view of hole 1190 that includes a flange 1192 extending about an upper part of hole 1190 to reduce the diameter of the upper part of hole 1190 (e.g., to a diameter d2 as shown in FIG. 11E) and a flange 1194 extending about a lower part of hole 1190 to reduce the diameter of the lower part of hole 1190 (e.g., to a diameter d1 as shown in FIG. 11E). Flanges 1192 and 1194 may capture a ratcheting button in hole 1190. FIG. 11G also shows first ratchet surface 1172 on a portion of the inner wall of hole 1190 (an opposing second ratcheting surface is not visible in this view). A first sidewall 1196 and second sidewall 1198 extend vertically along sides of ratchet surface 1172 to constrain a pawl (e.g., first pawl 942 or second pawl 944) and prevent rotation of a ratcheting button when a pawl is engaged with first ratchet surface 1172. Ratchet surface 1172 and sidewalls 1196, 1198 do not extend up to flange 1192 or down to flange 1194 so that there are gaps at the top and bottom to allow disengagement of pawls and rotation of a ratcheting button. While this provides an example of a hole configured to capture a ratcheting button and limit its rotation, other configurations may also be used. In some cases, ratchet surface 1172 may not have sidewalls (e.g., sidewalls 1196, 1198) and rotation of a ratcheting button may not be constrained as in the above example.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for physically securing a portable electronic device to a tabletop of a display table or to another display surface, comprising:
    a main body;
    a left arm, a right arm, an upper arm, and a lower arm, wherein each of the arms is retractable relative to the main body to secure the portable electronic device and is extendable relative to the main body to release the portable electronic device;
    a first circular gear that engages the left arm and the right arm for extension and retraction of the left arm and the right arm in tandem;
    a second circular gear that engages the upper arm and the lower arm for extension and retraction of the upper arm and the lower arm in tandem;
    first engagement features along a surface of the first circular gear opposing the second circular gear;
    second engagement features along a surface of the second circular gear opposing the first circular gear to engage the first engagement features;
    a lock mechanism to lock the first circular gear to the second circular gear and prevent independent rotation of the first circular gear and the second circular gear; and
    one or more fasteners that is/are attachable to the tabletop of the display table or to the other display surface to thereby secure the apparatus and the portable electronic device to the tabletop or the other display surface.

2. The apparatus of claim 1, wherein the first circular gear and the second circular gear are rotatable about a common axis of rotation.

3. The apparatus of claim 2, further comprising:
    an elongated member extending along the common axis of rotation and in contact with at least one of the first or second circular gears.

4. The apparatus of claim 3, further comprising:
    a spring located between the first circular gear and the second circular gear to normally bias the first circular gear and the second circular gear apart from one another.

5. The apparatus of claim 4, wherein the lock mechanism includes a threaded shaft that extends along the common axis of rotation to contact an end of the elongated member such that turning the threaded shaft causes the elongated member to move along the common axis of rotation and push the first and second circular gears together.

6. The apparatus of claim 5, wherein the threaded shaft has a knurled portion for turning the threaded shaft by hand, the knurled portion configured to be located below the tabletop of the display table.

7. The apparatus of claim 1, wherein
    the first circular gear turns in a first direction for extension and turns in a second direction that is opposite to the first direction for retraction of the left arm and the right arm; and
    the second circular gear turns in the second direction for extension and turns in the first direction for retraction of the lower arm and the upper arm.

8. The apparatus of claim 1, wherein:
    the lock mechanism includes a rotating cam body.

9. The apparatus of claim 1, wherein the lock mechanism is inaccessible when the apparatus is attached to the tabletop or to the other display surface, thereby preventing someone from releasing the arms after the arms have been retracted to secure the portable electronic device to the main body and the lock mechanism has been locked.

10. An apparatus for physically securing a portable electronic device to a tabletop of a display table or to another display surface, the apparatus comprising:
    a main body;
    a left arm, a right arm, an upper arm, and a lower arm, wherein each of the arms has a respective securing feature to secure a respective one of a plurality of sides of the portable electronic device, and each of the arms is retractable relative to the main body to secure the portable electronic device and is extendable relative to the main body to release the portable electronic device;
    a first circular gear that engages the left arm and the right arm, the first circular gear rotates about an axis in a first direction for extension of the left arm and the right arm in tandem and rotates about the axis in a second direction that is opposite to the first direction for retraction of the left arm and the right arm in tandem;

a second circular gear that engages the upper arm and the lower arm, the second circular gear rotates about the axis in the second direction for extension of the lower arm and the upper arm in tandem and rotates about the axis in the first direction for retraction of the lower arm and the upper arm in tandem;

a spring to normally bias the first circular gear and the second circular gear apart from one another; and a lock mechanism to lock the first circular gear and the second circular gear together to thereby prevent independent rotation of the first circular gear and the second circular gear.

11. The apparatus of claim 10 further comprising:

a post extending downward from a bottom of the main body; and one or more fasteners that extend downward from the post and is/are attachable to the tabletop of the display table or to the other display surface to thereby secure the apparatus and the portable electronic device to the tabletop or the other display surface.

12. The apparatus of claim 11, wherein:

the lock mechanism includes a shaft that extends along the axis through the post and is movable along the axis to cause the first circular gear and the second circular gear to engage.

13. The apparatus of claim 12, wherein:

the shaft includes a threaded portion such that rotation of the shaft causes the shaft to move along the axis and includes a knurled portion to enable tool-free rotation of the shaft.

14. The apparatus of claim 10, wherein:

the lock mechanism includes a rotating cam body to maintain the second circular gear at a raised location that keeps the first circular gear and the second circular gear engaged and rotates and drops to enable separation of the first circular gear and the second circular gear.

15. The apparatus of claim 10, wherein:

the left arm and the right arm have engagement features to engage corresponding engagement features of the first circular gear; and the lower arm and an upper arm have engagement features to engage corresponding engagement features of the second circular gear.

16. The apparatus of claim 10, wherein:

the first circular gear has first engagement features along a surface opposing the second circular gear; and the second circular gear has engagement features along a surface opposing the first circular gear to engage the first engagement features.

17. The apparatus of claim 11, wherein:

the lock mechanism is inaccessible when the apparatus is attached to the tabletop or to the other display surface, thereby preventing someone unlocking the arms and removing a portable electronic device from the main body after the portable electronic device has been secured to the main body and the lock mechanism has been engaged.

18. A security mount for physically securing a portable electronic device to a tabletop of a display table or to another display surface, the security mount comprising:

a main body having a top, a bottom, and walls that extends between the top and the bottom;

a post extending downward from the bottom of the main body;

one or more fasteners extending downward from the post and attachable to the tabletop of the display table or to the other display surface to thereby secure the security mount and the portable electronic device to the tabletop or the other display surface;

a left arm, a right arm, an upper arm, and a lower arm, wherein each of the arms is retractable relative to the main body to secure the portable electronic device and is extendable relative to the main body to release the portable electronic device;

a first circular gear that engages the left arm and the right arm, the first circular gear rotates about an axis in a first direction for extension of the left arm and the right arm in tandem and rotates about the axis in a second direction that is opposite to the first direction for retraction of the left arm and the right arm in tandem;

a second circular gear that engages the lower arm and the upper arm, the second circular gear rotates about the axis in the second direction for extension of the lower arm and the upper arm in tandem and rotates about the axis in the first direction for retraction of the lower arm and the upper arm in tandem;

a spring to normally bias the first circular gear and the second circular gear apart from one another;

an elongated member extending along the axis through the first circular gear and the second circular gear; and a lock mechanism coupled to the elongated member, the lock mechanism having an unlocked configuration in which the first circular gear and the second circular gear are separated by the spring and a locked configuration in which the first circular gear and the second circular gear are forced together by the elongated member.

19. The security mount of claim 18, wherein the lock mechanism includes a shaft that is movable between a locked configuration in which the shaft maintains the elongated member and the second circular gear in a raised position such that the second circular gear engages the first circular gear and an unlocked configuration in which the shaft maintains the elongated member in a lowered position and the spring maintains separation between the first circular gear and the second circular gear.

20. The security mount of claim 18, wherein the lock mechanism extends downward from the post for access from an underside of the tabletop to prevent someone from releasing the lock mechanism without accessing the underside of the tabletop.

* * * * *